United States Patent [19]

Peterson

[11] E Re. 30,509

[45] Reissued Feb. 10, 1981

[54] REFUSE COMPACTOR

[76] Inventor: Robert A. Peterson, 16521 Redwood Dr., Cerritos, Calif. 90701

[21] Appl. No.: 953,500

[22] Filed: Oct. 23, 1978

Related U.S. Patent Documents

Reissue of:

[64] Patent No.: 3,835,769
Issued: Sep. 17, 1974
Appl. No.: 387,436
Filed: Aug. 10, 1973

U.S. Applications:

[63] Continuation-in-part of Ser. No. 254,067, May 17, 1972, abandoned.

[51] Int. Cl.[2] ..... B30B 1/32; B30B 15/16

[52] U.S. Cl. ..... 100/227; 100/51; 100/53; 100/266; 100/269 A; 100/295

[58] Field of Search ..... 53/432; 100/51, 53, 100/90, 266, 269 R, 265, 226, 227, 228, 245, 269 A, 295; 425/405; 264/102

[56] References Cited

U.S. PATENT DOCUMENTS

| | | | |
|---|---|---|---|
| 293,335 | 2/1884 | Knapp | 100/90 X |
| 1,703,783 | 2/1929 | Schmidt | 100/265 |
| 2,465,839 | 3/1949 | Bloomfield | 100/266 |
| 3,254,467 | 6/1956 | Garrow et al. | 53/432 |
| 3,478,909 | 11/1969 | Charles | 100/266 |
| 3,575,103 | 4/1971 | Charles | 100/269 |
| 3,736,863 | 6/1973 | Brucker | 100/53 |

FOREIGN PATENT DOCUMENTS

| | | | |
|---|---|---|---|
| 1327946 | 4/1963 | France | 53/432 |

*Primary Examiner*—Billy J. Wilhite
*Attorney, Agent, or Firm*—Frederick E. Mueller

[57] ABSTRACT

The cover of a refuse container, adapted to be sealed upon the container, is internally provided with a bellows having a pressure plate to bear against the material being compacted as the plate moves downwardly in the container in response to expansion of the bellows. The plate assembly and container define a collapsible chamber from which air is evacuated by a power means to reduce the internal pressure while air at atmospheric pressure expands the inside of the bellows. Automatic means to vent the evacuated collapsible chamber to atmosphere is provided in a control system that includes the power means to evacuate air. The container may be independent of the other elements of the invention and may be supported for translatory movement in and out of operative connection to the power means and cover whereby a plurality of containers may be employed with a single power system.

23 Claims, 4 Drawing Figures

REFUSE COMPACTOR

Matter enclosed in heavy brackets [ ] appears in the original patent but forms no part of this reissue specification; matter printed in italics indicates the additions made by reissue.

This is a continuation-in-part of my application filed on May 17, 1972 as Serial No. 254,067 now abandoned.

BACKGROUND OF THE INVENTION

This invention relates to refuse compactors adapted principally to providing compacting of garbage in a back door domestic garbage can or receptacle but which may also be employed in commercial or industrial establishments.

Heretofore it has been proposed to employ superatmospheric pressure means expandable downwardly from the cover for compacting the refuse in the can. Such devices become expensive and, in some instances, possibly dangerous in the event of the development of excess air pressure. They require specially constructed cans and covers with attachments to secure the two together and withstand the pressures developed. The source of compressed air has generally been connected by a hose to the cover which was susceptible to disconnection by children or other users.

SUMMARY OF THE INVENTION

According to the present invention, the cover interiorly carries a vertically movable pressure plate at the end of a bellows and the can is evacuated of air to provide the necessary motive power for expanding the pressure plate downwardly against the refuse in the can or receptacle. The entire power unit is contained within the can cover and needs only suitable electrical connections thereto. The bellows type expandable unit provides for a reasonable tilting of the pressure plate as may be determined by the load of refuse in the can. The cover and the pressure plate may be interconnected by means of constantly tensioned springs to retract the pressure plate to its upper position after the evacuated can has been vented to atmosphere. Automatic means may be employed to limit the movement of the pressure plate and/or determine the compacting stroke thereof.

DESCRIPTION OF THE PREFERRED EMBODIMENTS

Figure 1:
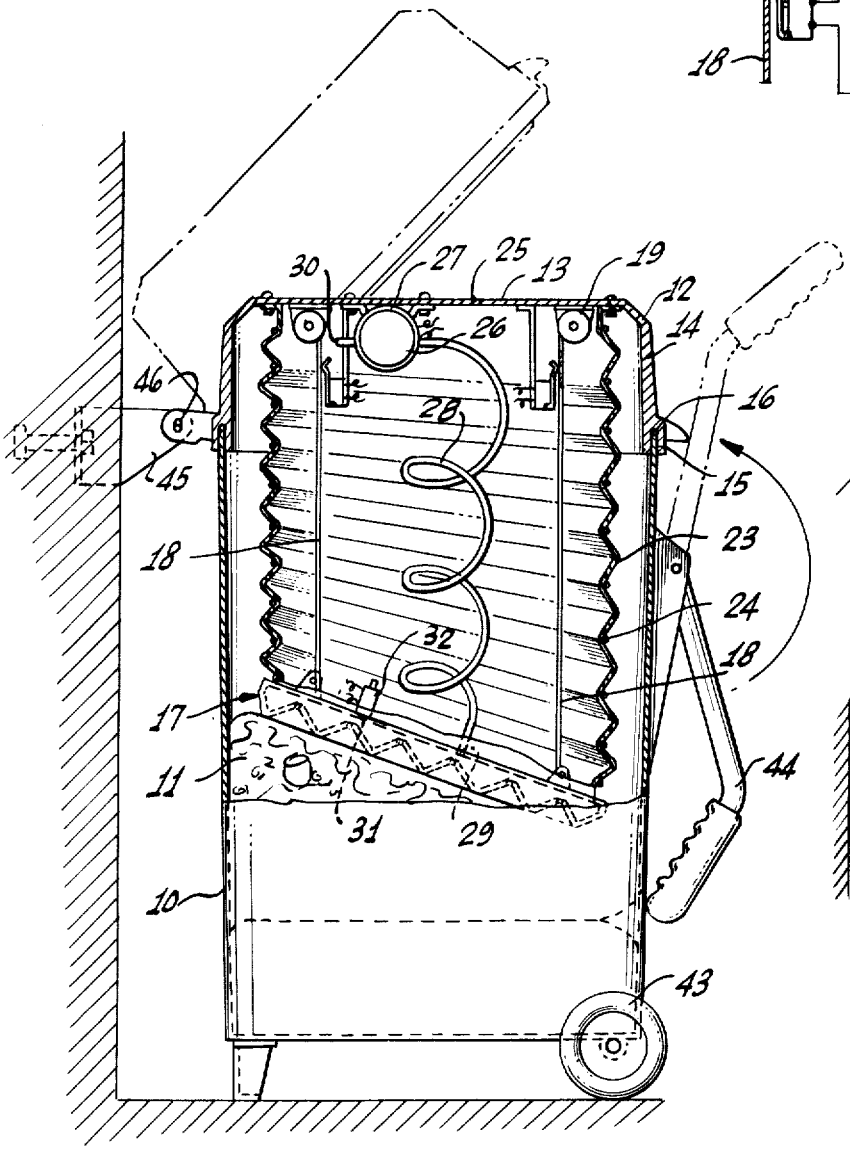
FIG. 1 is a vertical central section of a can and cover with the pressure plate disposed in an extended compacting position.
Figure 2:
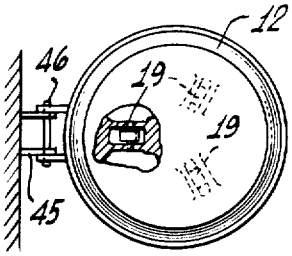
FIG. 2 is a top plan view of the cover. with parts broken away to show various parts in the cover.

Referring to FIG. 1, a can 10 is disposed with an open top for receiving bags 11 of garbage and refuse or the like. A dome-like cover 12 is formed with a top wall 13 and a depending circumferential skirt 14 whose lower edge is formed with an annular groove 15 to matingly receive the upper edge of the can 10. In order to insure an endless air tight connection between the cover 12 and can 10, an endless seal 16 is seated at the blind end of the groove 15. Preferably, this seal is made of an elastomeric material that is semi-cylindrical in radial cross-section to define an essentially flat face that is exposed to the upper edge of the can 10.

As indicated, the can 10 and cover 12 are preferably of circular horizontal cross-sectional configuration. Both of these elements are essentially rigid and, therefore, may be formed of a metallic material or of an essentially rigid synthetic plastic material, for example.

A pressure plate assembly 17 is suspended from the underside of the top wall 13 of the cover by means of three reeled tapes 18, each biased by a constant tension spring roll construction 19 to lift the assembly to its uppermost position when not being actuated to compact refuse in the can. The assembly 17 comprises a generally flat circular disc 20 to which the lower ends of the tapes 17 are attached and a generally circular corrugated face plate 21, spaced downwardly therefrom and secured at its circumferential edge to the disc 20 to define a plenum 22 therebetween. A tubular bellows 23, that is made of a flexible air tight material, has a lower edge secured in air-tight relationship to the upper face of the disc 20 and has its upper edge secured in air-tight relationship to the underside of the top wall 13 of the cover. In order to reinforce the bellows 23 against tilting and snaking as it reciprocates within the can 10, the radially inner roots of the convolutions are reinforced with coils 24 of a wire material. The interior of the airtight bellows chamber construction is vented to atmosphere by means of one or more holes 25 formed in the top wall 13 of the cover.

Compacting is effected by evacuating the air in the can from beneath the pressure plate whereby the latter is forced downwardly upon the refuse by the atmosphere above the pressure plate. For this purpose an electric motor 26 and vacuum pump 27 are carried by the cover 12 in the space between the underside of top wall 13 and the pressure plate assembly 17. The input of vacuum pump 27 is connected by a quantity of flexible tubing 28 to an opening 29 in disc 20, the tubing 28 providing for extension as the pressure plate moves downwardly in the can 10, increasing the distance between the pump 27 and opening 29. A discharge 30 of pump 27 opens directly into the interior of the bellows chamber assembly which, in turn, is directly freely vented to the outside atmosphere through the hole or holes 25.

A relief opening 31 extends through disc 20 and normally connects the space within container 10 to the outside atmospheric pressure via the bellows 23 and vent openings 25. The opening 31 is closed during operation of pump 27, as by a solenoid valve 32 connected in the electrical power line to the motor 26. The plenum 22 beneath the disc 20 is freely connected through a plurality of openings 33 in face plate 21 to the interior of the bellows 23. When pump 27 is actuated, air within the can 10 is drawn upwardly through openings 33, tubing 28, and pump 27, to be discharged at 30 to the interior of the bellows 23 and from thence through openings 25 having communication with the outside atmosphere. At the same time, relief opening 31 is closed by valve 32 whereby atmospheric pressure on the pressure plate assembly 17 forces the latter downwardly into the can 10 to compact the refuse therein.

The face plate 21 is corrugated and openings 33 are distributed therein at both the top and bottom of the corrugations to prevent clogging of the vacuum path by refuse and provide for drainage in the event any liquid from the refuse should enter the plenum 22.

Figure 3:
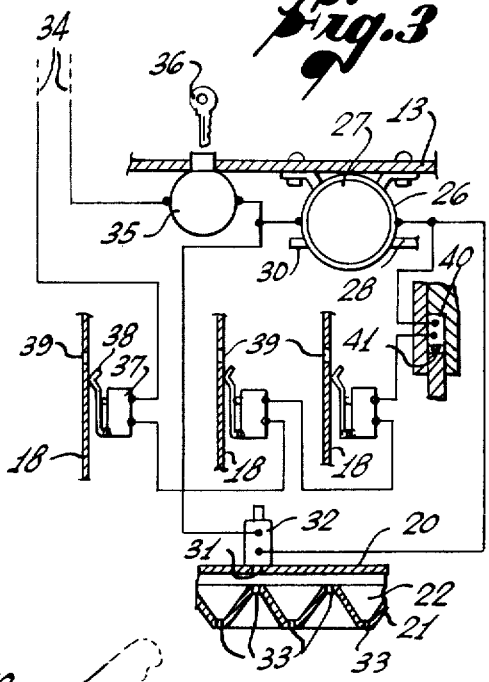
FIG. 3 is a wiring diagram showing the controls for actuating the motor and determining the compacting operation.

Referring to the electrical circuit of FIG. 3, the motor 26 is connected to a power source, preferably the usual 115 volt line available in most houses, by a suitable dual line 34. A timer switch 35 in line 34 is closed by manipulation with a key 36 and is adapted to hold in a closed position for a given length of time after initiating a compacting operation and to reset the switch open until it is desired to initiate another compacting operation. A safety micro-switch 37 is provided in line 34 for each of the tapes 18 to open the motor circuit in the event one of the tapes reaches a given extremity of downward movement, indicating that pressure plate 17 may have been tilted to its limits or may have moved as far down in can 10 as desired. For this purpose each micro-switch 37 has a lever 38 bearing against the corresponding tape 18 and disposed to drop into a slot or hole 39 in the tape at the position of the latter for actuating the switch to open the line 34.

An additional one or more micro-switches 40 in line 34 are disposed to be actuated to close the line only when cover 12 is properly located on can 10. For this purpose the micro-switches 40 are disposed in spaced relation around the lower edge of the cover skirt 14 with their actuating plungers 41 adapted to engage the top of the rim of the can 10. If the cover 12 should not be located properly on can 10, at least one of the micro-switches 40 will remain open, thereby preventing actuation of motor 26.

In FIG. 1 the pressure plate assembly 17 is illustrated in a downwardly extended compacting position, as a result of the excess of atmospheric pressure within the bellows 23 over the internal pressure of the sealed container 10. In view of the tilted condition of the pressure plate assembly 17 inducing a desired maximum degree of extension of one of the tapes 18, the switch arm 38 of the corresponding one of the switches 37 is depicted as having penetrated a hole or slot 39 of the tape, effecting an opening of the circuit to the motor 26 for the pump 27. Upon opening of the circuit the solenoid for the valve 32 is deenergized, thereby venting the enclosed volume of the container 10 to atmosphere. As a consequence, the spring roll mechanisms 19 are enabled to effect a retraction of the pressure plate assembly 17, simultaneously collapsing the bellows 23, to lift the pressure plate assembly to a position within the skirt 14 of the cover 12.

It will be observed that all of the power and control elements of the invention are substantially fully enclosed within the bellows assembly which, accordingly, may be employed with a plurality of like containers 10. With this arrangement, an individual container can be filled with compacted refuse almost to full capacity, after which it may be wheeled away to be replaced by another container. In this arrangement, each container may be provided with a means for translatory movement, as for example wheels 43, and a handle mechanism 44 which, if desired, may be of the type to be pivotally moved between operative and inoperative positions. The cover and bellows assembly is preferably mounted in a fixed location, as for example on a bracket 45, having a loose hinge connection, indicated at 46, with the skirt 14 of the cover. Preferably, the weight of the cover assembly is counterbalanced, as for example by providing a torsion spring at the hinge connection, whereby the cover assembly may be readily lifted to the dotted outline indicated. By virtue of the loose hinge connection 46, generous tolerances are provided to accomodate different overall variations in heights of different containers 10.

Figure 4:
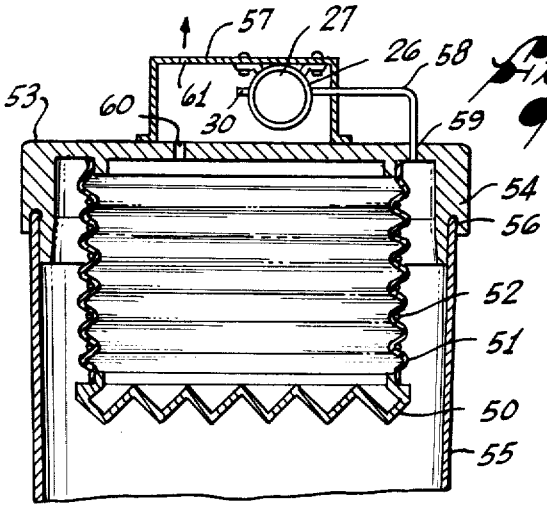
FIG. 4 is a partial section similar to FIG. 1, showing an alternative embodiment of the invention.

In FIG. 4, an alternative construction of the invention is employed wherein an imperforate circular and circularly corrugated pressure plate 50 is directly mounted in air sealing engagement to the lower end of an imperforate bellows 51. As before, the bellows 51 is reinforced by means of coils of wire 52 at the roots of the convolutions of the bellows. The upper end of the bellows is directly secured in air sealing engagement with the underside of a top wall 53 of a cover 54. In order to define an air-tight engagement between the cover 54 and a container 55, the lower edge of the skirt of the cover 54 is formed with an annular groove 56 that matingly engagingly receives the upper edge of the wall of the container 55.

In this construction, the pressure plate 50 and bellows 51 are also radially spaced from the walls of the can 55. A housing 57 on top of the cover 54 internally supports the vacuum pump 27 and its drive motor 26, the former having communication, through a conduit 58 to an opening 59 in the top wall 53 of the cover, with the annular clearance space within the container 55. The outlet 30 of the vacuum pump 27 has communication with the interior of the bellows chamber through another hole 60 in the top wall 53 and with atmospheric pressure through a vent or vents 61 formed in the top of the cover 57.

In the embodiment of FIG. 4 spring biased retraction tapes 18 may be employed in the same manner as shown in the embodiment of FIG. 1. The control system of FIG. 3 may be fully employed in the embodiment of FIG. 4 including vent valve 32 which, in the instance of FIG. 4, may be conveniently associated with the conduit 58. It is to be particularly noted with respect to the embodiment of FIG. 4 that it provides means for evacuating air from within the container 55 otherwise than directly through the plate 50.

Various modes of carrying out the invention are contemplated as being within the scope of the following claims.

I claim:

1. A refuse compactor comprising:

a rigid container having a cover for closing a refuse receiving opening of said container;

an air seal means for sealing the junction of said cover with said opening when said cover is closed;

a flexible air-tight means peripherally affixed to said cover and dividing said container into two separate chambers one of which is defined, at least in part, by said cover;

means to communicate said one of said two chambers to atmospheric pressure;

and means to evacuate air from the other of said two chambers to effect movement of said flexible means by atmospheric pressure in a direction to reduce the volume of said other chamber to compact refuse within said other chamber while biasing said cover against said air seal means to prevent leakage of atmospheric pressure into said other chamber.

2. A refuse compactor as in claim 1 in which said flexible means comprises a rigid plate that is peripherally mounted in air-sealing engagement with an impervious sheet of a flexible material.

3. A refuse compactor as in claim 2 in which said sheet of flexible material comprises a tubular bellows that is closed at one end by said plate.

4. A refuse compactor as in claim 1 in which said means to evacuate air from the other of said chambers includes an opening formed through said flexible means.

5. A refuse compactor as in claim 1 in which said means to evacuate air from the other of said chambers includes an opening in a portion of said walls bounding the other of said chambers.

6. A refuse compactor as in claim 1 having a means to vent said other chamber to atmospheric pressure after actuation of said means to evacuate air from said other chamber.

7. A refuse compactor as in claim 6 in which said means to vent said other chamber comprises a valve.

8. A refuse compactor comprising;

a rigid container means;

a rigid pressure plate;

an air-tight sheet of a flexible material having one edge fixedly sealed to the periphery of said plate and the other edge fixedly sealed to a surrounding wall of said container means to define an endless hermetic seal that movably supports said plate within said container to generally confine an enclosed volume of said container means adapted to contain refuse;

means to evacuate air from the volume of said container means that is enclosed by said plate and said sheet to move said plate by atmospheric pressure in a direction to compact refuse in said container means;

and means to vent the enclosed volume of said container means to atmosphere, after actuation of said means to evacuate air [.], *as a function of a desired degree of movement of said plate by atmospheric pressure in said direction to compact refuse.*

9. A refuse compactor as in claim 8 having a means to retract said pressure plate after actuation of said means to vent the enclosed volume to atmosphere.

10. A refuse compactor as in claim 8 in which said sheet of flexible material comprises a tubular bellows that is closed at one end by said pressure plate.

11. A refuse compactor as in claim 8 in which said container means comprises a separably joined pair of sealingly engageable parts.

12. A refuse compactor as in claim 11 in which one of said parts comprises a cover to which said other edge of said sheet material is secured.

13. Self-contained apparatus for compacting refuse within a plurality of containers that may be sequentially connected thereto, comprising;

a cover adapted to be engaged with the openings of containers consecutively connected thereto;

a rigid pressure plate;

means extensibly and retractably supporting said plate from the inside of said cover;

flexible means carried at the periphery of said plate for defining an endless hermetic seal for the volume of a container that is covered by said plate and by said flexible means;

and power means in said cover having communication with the covered volume to evacuate air from the covered volume to extend said plate by atmospheric pressure to compact refuse in a container then connected to said cover.

14. Self contained apparatus as in claim 13 having a means to vent the covered volume to atmosphere after actuation of said power means.

15. Self contained apparatus as in claim 14 in which said means to vent includes a valve operatively associated with an opening through said plate.

16. Self contained apparatus as in claim 13 in which said flexible means comprises an endless sheet of material having one edge secured to the periphery of said plate and the other edge secured to said cover.

17. Self contained apparatus as in claim 16 in which said endless sheet comprises a tubular bellows.

18. Self contained apparatus as in claim 16 in which said cover is adapted to be sealingly engaged with the openings of containers consecutively connected thereto.

19. A refuse compactor comprising:

a rigid container;

a cover for closing an opening in said container;

a rigid pressure plate;

an endless sheet of a flexible air-tight material having one edge secured to said plate and having the other edge secured to said cover;

power means connected to said cover and having communication with the volume of said container that is covered by said plate and by said endless sheet to evacuate air from the enclosed volume to move said plate by atmospheric pressure to compact refuse in the said container;

and vent means having communication with the enclosed volume of said container to vent the enclosed volume to atmosphere after actuation of said power means.

20. A refuse compactor as in claim 19 in which said endless sheet is arranged in a bellows configuration.

21. A refuse compactor as in claim 19 in which said vent means includes a valved opening through said pressure plate.

22. A refuse compactor as in claim 19 having a means on said cover to extensibly and retractably support said plate.

23. A refuse compactor as in claim 22 in which said means to extensibly and retractably support said plate, said power means, and said vent means are mounted inside said cover and said flexible sheet, said sheet comprising a tubular bellows.

* * * * *